(No Model.)
A. NEWKIRK.
DEVICE FOR TIGHTENING WIRES.
No. 445,280. Patented Jan. 27, 1891.
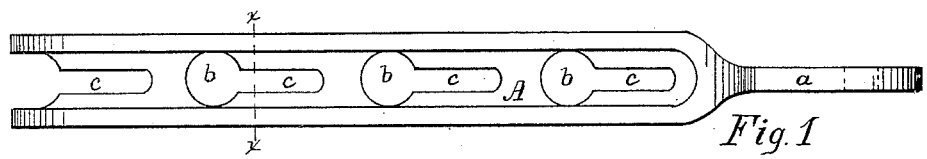
Fig. 1
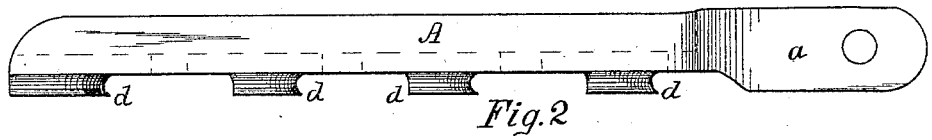
Fig. 2
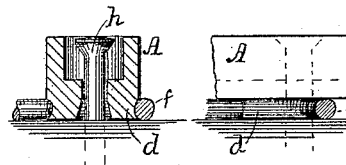 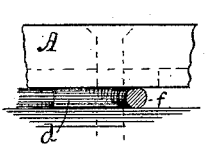 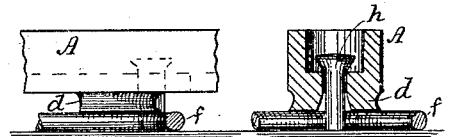 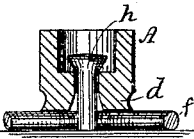
Fig. 3   Fig. 4   Fig. 5   Fig. 6
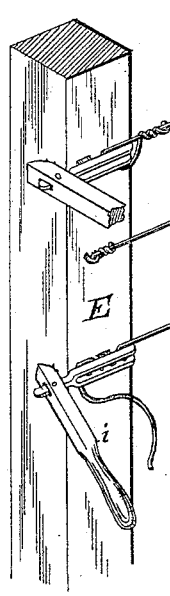 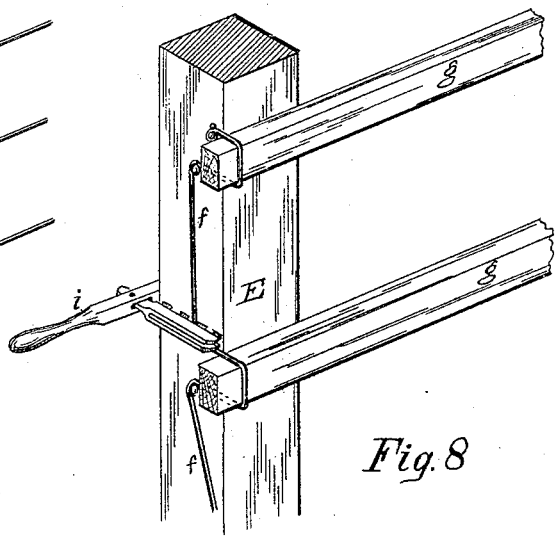
Fig. 7   Fig. 8
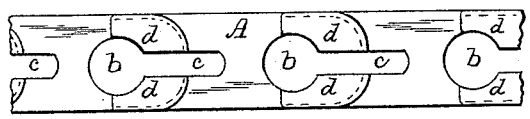
Fig. 9
Witnesses:
L. R. Vorce
L. Prutist
Inventor:
Abram Newkirk
by C. W. Vorce Atty

UNITED STATES PATENT OFFICE.

ABRAM NEWKIRK, OF CLEVELAND, OHIO.

DEVICE FOR TIGHTENING WIRES.

SPECIFICATION forming part of Letters Patent No. 445,280, dated January 27, 1891.

Application filed April 10, 1890. Serial No. 347,408. (No model.)

*To all whom it may concern:*

Be it known that I, ABRAM NEWKIRK, a citizen of the United States, residing at Cleveland, in the county of Cuyahoga and State of Ohio, have invented certain new and useful Improvements in Devices for Tightening Wires; and I do hereby declare the following to be a full, clear, and exact description of the invention, such as will enable others skilled in the art to which it appertains to make and use the same.

My invention relates to devices for straining tight the wires of fences, trellises, &c.; and it consists in the construction and combination of parts hereinafter described, and specifically pointed out in the claims.

In the drawings, Figure 1 is a top plan view, and Fig. 2 a side view, of a wire-tightener constructed according to my invention. Figs. 3 and 4 are respectively cross-section and side view showing the wire engaged by the hooks and a nail driven in as far as is done before removing the tightener. Figs. 5 and 6 show the tightener lifted up to clear the wire and ready to be drawn forward and removed. The line of section of Figs. 3 and 6 is indicated by $x$ $x$ in Fig. 1. Fig. 7 is a perspective view of a portion of a wire fence or trellis; and Fig. 8, a similar view of a post-and-rail fence, showing in each case the wire being strained by this device. Fig. 9 is a plan view of part of the under side of the tightener, showing the arrangement of the hooks with reference to the openings for the nail or staple.

The device consists of a bar A, channeled on top for nearly its entire length and provided with openings $b$ $b$ through the bottom, which openings are large enough to allow the head of a large nail to pass through. The bar A ends in a shank $a$, provided with one or more holes for the attachment of a suitable handle or lever. $c$ $c$ are recesses extending from the holes $b$ $b$ toward the shank $a$ to a length a little more than sufficient to admit a staple and of a width somewhat exceeding that of the staple or nail to be used. On the under side of the bar A is a series of hooks $d$ $d$, placed in pairs, one pair adjoining each of the recesses $c$ and so located that the shank of the hook on the side toward the shank end of the bar A is about midway of the recess.

In using the device on post-and-rail fences the hooks $d$ $d$ are hooked over the wire, as shown in Fig. 8. On wire fence or trellis the hooks engage a loop of the wire, as seen at the upper wire in Fig. 7, or the wire may be rove back and forth around two or more pairs of the hooks, as seen at the lower wire in Fig. 7, and in any case the wire is strained tight by means of the handle or lever $i$. When the wire is sufficiently strained, the nail or staple is inserted in the recess between the hooks which strain the wire and bearing against the wire, and is driven nearly home, as shown in Fig. 3. The pressure is then relaxed, the bar A is pushed slightly back to disengage the hooks from the wire, which the length of the recess permits, and the hooks being disengaged the bar A is lifted to the position shown in Fig. 6 and drawn forward again to bring the nail into the opening $b$, when the bar is lifted off and removed. The nail or staple being thus driven tight against the wire while it is under strain, there is no possibility of the wire slacking when the hooks are removed and the wire remains strained as tight as it has been drawn. The nail or staple is then driven home and the work is completed.

Although it is not essential that the recess $c$ should be narrower than the opening $b$, yet it is preferable, for the reason that it aids in starting the nail or staple straight instead of slanting and prevents it from bending to one side during the driving.

E represents the fence-post; $f$, the wire; $g$, the rails, and $h$ the nail or staple, as the case may be.

By providing a number of pairs of hooks, each accompanied by a separate opening and recess, the tightener is adapted to any size of post and the solid portion between the several openings acts as a bridge to prevent the two sides of the bar from being drawn together so as to pinch the nail or staple, as would be likely to occur if the bar A were completely slotted instead of being provided with the series of holes. The bar A may be flat, but is preferably channeled, as it prevents driving the nail too far in before removing the bar, as would otherwise be liable to occur.

What I claim is—

1. A wire-tightener consisting of a perforated bar adapted to have a lever attached thereto and having recesses extending from the openings in said bar, and hooks on the under side of the bar on each side of the recesses and about midway thereof, substantially as described, and for the purposes set forth.

2. In a wire-tightener, the combination of the hooks $d\,d$, the recesses $c\,c$, and the holes $b\,b$, arranged with reference to each other in the channeled bar A, provided with means for the attachment of a handle or lever, substantially as shown and described.

In testimony whereof I affix my signature in presence of two witnesses.

ABRAM NEWKIRK.

Witnesses:
WM. G. TAYLOR,
L. PRENTISS.